Dec. 1, 1925.

W. H. WEGERT

GEAR

Filed May 14, 1924

1,564,160

Inventor

WILLIAM H. WEGERT.

By

Attorney

Patented Dec. 1, 1925.

1,564,160

UNITED STATES PATENT OFFICE.

WILLIAM H. WEGERT, OF RACINE, WISCONSIN.

GEAR.

Application filed May 14, 1924. Serial No. 713,322.

*To all whom it may concern:*

Be it known that I, WILLIAM H. WEGERT, a citizen of the United States, residing at Racine, in the county of Racine and State of Wisconsin, have invented certain new and useful Improvements in Gears, of which the following is a specification.

My said invention relates to a silent gear intended particularly for use in automobiles to prevent noise in the motor due to back slap in the gears connecting the camshaft and the crankshaft.

Figure 2:
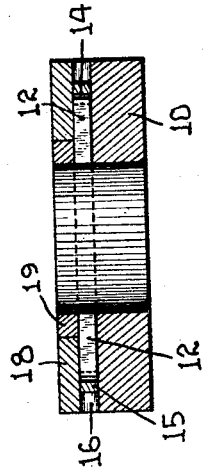
Figure 1:
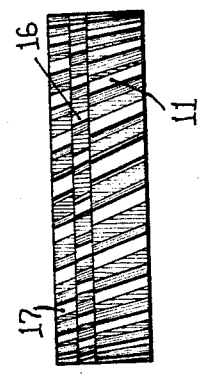
Figure 5:
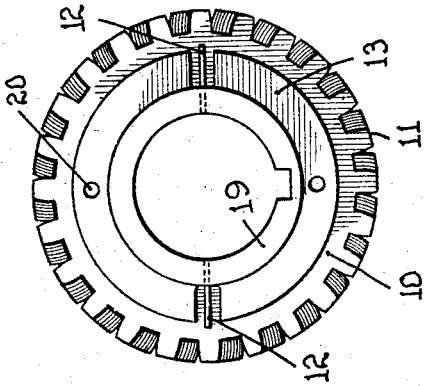
Figure 4:
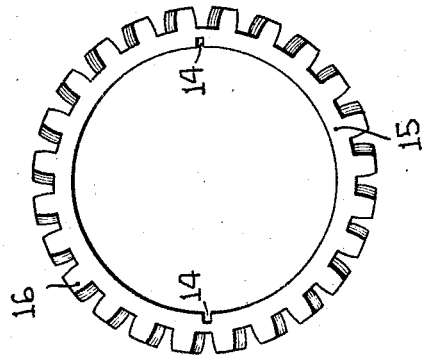
Figure 3:
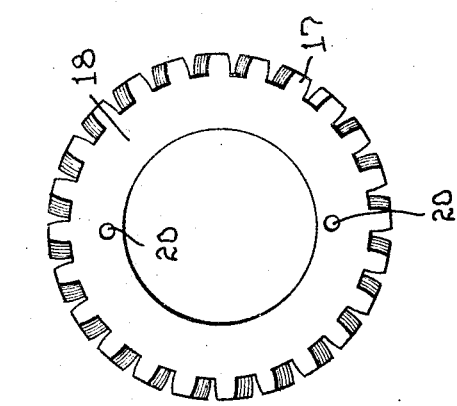

Referring to the accompanying drawings, which are made a part hereof and on which similar reference characters indicate similar parts, Figure 1 is an elevation of my device, Figure 2, a vertical central section, and Figures 3, 4 and 5 plan views of the constituent elements.

In the drawings reference character 10 indicates the main or body member of the gear, said member having teeth 11 as usual in devices of this character. A pair of leaf springs 12 are secured in diametrically opposite apertures in an extension 13 of this body, the ends of the springs being adapted to engage notches 14 in a ring 15 fitting about the extension 13 and having teeth 16 which are out of line with the teeth 11 and the teeth 17 of another ring 18. The ring 18 has a central aperture smaller than that in the ring 15 adapted to fit about a further extension 19 on the body member, the dimensions of the parts being such that the ring 18 covers the apertures in which the springs 12 are located. The teeth 17 as will be seen in Figure 1 are in line with the teeth 11 but out of line with the teeth 16.

The two rings are held on the body by means of screws or rivets passing through holes 20 in the body and the upper ring so that the upper ring is rigidly secured to the body whereas the intermediate ring is free to rotate with respect to each of the other members. It will be seen from the foregoing that the teeth 16 will be resiliently held against one side of a tooth of the gear meshing with the gear illustrated in Figure 1 while the teeth 11 and 17 are in engagement with the opposed face of the next tooth and that this relation will persist no matter how much the teeth of such gears become worn, or at least so long as they remain in fit condition for use.

It will be obvious to those skilled in the art that my device may be modified without departing from the spirit of the invention and therefore I do not limit myself to what is shown in the drawings and described in the specification but only as indicated in the appended claims.

Having thus fully described my said invention, what I claim as new and desire to secure by Letters Patent is:

1. A gear comprising a plurality of toothed sections disposed in end to end relation, one of said sections having a hub extending through and forming the hub for the other of said sections, the end sections forming said gear being secured in fixed relation, a leaf spring secured in a radial recess in said hub, one of said toothed sections having a notch engaged by the end of said leaf spring and holding the teeth of the said section out of alinement with the teeth of the other sections, substantially as set forth.

2. A silent gear comprising a body section having an axial extension, radially extending leaf springs located in radial apertures in said extension, a ring surrounding said extension said ring having notches on its inner periphery engaged by the outer ends of said leaf springs, a second ring surrounding an axial extension of the body said second ring being fixed to the body and said first-named ring having teeth held out of alinement with the teeth of the other members by the action of said springs, substantially as set forth.

In witness whereof, I have hereunto set my hand and seal at Racine, Wisconsin, this 30th day of April, A. D. nineteen hundred and twenty-four.

WILLIAM H. WEGERT. [L. S.]